United States Patent
Wisnewski et al.

(10) Patent No.: US 12,190,578 B2
(45) Date of Patent: Jan. 7, 2025

(54) AUGMENTED-REALITY OBJECT LOCATION-ASSIST SYSTEM

(71) Applicant: Kyndryl, Inc., New York, NY (US)

(72) Inventors: Benjamin C. Wisnewski, Columbia, MO (US); Aaron Thomas Corette, Hamlin, NY (US); Maxim Y. Litvinenko, Centennial, CO (US); Greg Reed Estep, San Diego, CA (US)

(73) Assignee: Kyndryl, Inc., New York, NY (US)

( * ) Notice: Subject to any disclaimer, the term of this patent is extended or adjusted under 35 U.S.C. 154(b) by 404 days.

(21) Appl. No.: 17/552,459

(22) Filed: Dec. 16, 2021

(65) Prior Publication Data

US 2023/0196764 A1   Jun. 22, 2023

(51) Int. Cl.
| | |
|---|---|
| *G06V 20/20* | (2022.01) |
| *G06Q 30/0601* | (2023.01) |
| *G06T 7/50* | (2017.01) |
| *G06T 19/00* | (2011.01) |
| *G06V 10/25* | (2022.01) |

(52) U.S. Cl.
CPC ......... *G06V 20/20* (2022.01); *G06Q 30/0639* (2013.01); *G06T 7/50* (2017.01); *G06T 19/006* (2013.01); *G06V 10/25* (2022.01); *G06T 2207/20081* (2013.01)

(58) Field of Classification Search
CPC ...... G06V 20/20; G06V 10/25; G06V 10/454; G06V 10/82; G06T 19/006; G06T 7/70–77; G06T 7/50; G06T 2207/20081; G06T 2207/20084; G06Q 30/0639; G06Q 30/0641; G06Q 30/0643; G06N 3/02–0985; G06N 20/00–20
See application file for complete search history.

(56) References Cited

U.S. PATENT DOCUMENTS

| | | |
|---|---|---|
| 6,000,610 A | 12/1999 | Talbott et al. |
| 2002/0178013 A1 | 11/2002 | Hoffman et al. |
| 2009/0182499 A1 | 7/2009 | Bravo et al. |
| 2014/0207615 A1* | 7/2014 | Li ..................... G06Q 30/0623 705/26.61 |

(Continued)

OTHER PUBLICATIONS

Tonioni, Alessio, Eugenio Serra, and Luigi Di Stefano. "A deep learning pipeline for product recognition on store shelves." 2018 IEEE International Conference on Image Processing, Applications and Systems (IPAS). IEEE, 2018. (Year: 2018).*

(Continued)

*Primary Examiner* — Geoffrey E Summers
(74) *Attorney, Agent, or Firm* — CANTOR COLBURN LLP; Erik Swanson

(57) ABSTRACT

Data-analysis-based processing facilitates providing augmented-reality object location assistance. The processing includes obtaining a user-request related to facilitating locating an object of interest, and identifying a target area containing the object. Further, the process includes providing augmentation data for rendering as an overlay on a user-device to assist in directing the user to the target area containing the object. The augmentation data being provided is dynamically changed as the user-device is moved in relation to the target area containing the object to assist the user in locating the object within the target area.

9 Claims, 10 Drawing Sheets

(56) References Cited

U.S. PATENT DOCUMENTS

| | | | | |
|---|---|---|---|---|
| 2014/0214600 | A1* | 7/2014 | Argue | G06Q 30/0639 |
| | | | | 705/26.8 |
| 2016/0155011 | A1 | 6/2016 | Sulc et al. | |
| 2019/0236531 | A1* | 8/2019 | Adato | G06T 7/0002 |
| 2020/0250738 | A1* | 8/2020 | Liu | H04B 17/27 |
| 2020/0302510 | A1* | 9/2020 | Chachek | G06Q 30/0639 |

OTHER PUBLICATIONS

Cruz, Edmanuel, et al. "An augmented reality application for improving shopping experience in large retail stores." Virtual Reality 23 (2019): 281-291. (Year: 2019).*

Roy, Priya, and Chandreyee Chowdhury. "A survey of machine learning techniques for indoor localization and navigation systems." Journal of Intelligent & Robotic Systems 101.3 (2021): 63. (Year: 2021).*

Ma, Jeremy, Timothy H. Chung, and Joel Burdick. "A probabilistic framework for object search with 6-dof pose estimation." The International Journal of Robotics Research 30.10 (2011): 1209-1228. (Year: 2011).*

Mell, Peter and Tim Grance, "The NIST Definition of Cloud Computing," National Institute of Standards and Technology, Information Technology Laboratory, Special Publication 800-145, Sep. 2011, pp. 1-7.

Winlock, Tess, et al., "Toward Real-time Grocery Detection for the Visually Impaired," 2010 IEEE Computer Society Conference on Computer Vision and Pattern Recognition—Workshops, Jun. 2010, pp. 49-56.

Varol, Gül et al., "Toward Retail Product Recognition on Grocery Shelves," Sixth International Conference on Graphic and Image Processing, Mar. 2015, pp. 1-7.

Oplenskedal, Magnus Karsten et al., "Automated Product Localization Through Mobile Data Analysis," $20^{th}$ IEEE International Conference on Mobile Data Management (MDM), Jun. 2019, pp. 18-26.

Jayananda, P.K. V et al., "Augmented Reality Based Smart Supermarket System with Indoor Navigation Using Beacon Technology (Early Shopping Android Mobile App)," Dec. 2018, pp. 1-6.

Franco, Annalisa et al., "Grocery Product Detection and Recognition," Expert Systems with Applications, Feb. 2017, pp. 1-41.

Agnihotri, Meeshu et al., "Rist: An Interface Design Project for Indoor Navigation," In: Stephanidis C. (eds) HCI International 2017—Posters' Extended Abstracts. HCI 2017. Communications in Computer and Information Science, vol. 714. Springer, Cham. https://doi.org/10.1007/978-3-319-58753-0_48, pp. 327-334.

Van Grove, Jennifer, "New iPhone App Locates Products in Aisles at Stores," Nov. 22, 2010, pp. 1-4.

Bergh, Wendy, "Find Items Even Easier with 'Search My Store'," Oct. 31, 2014, pp. 1-3.

* cited by examiner

AUGMENTED-REALITY OBJECT LOCATION-ASSIST SYSTEM

BACKGROUND

Within storage and retail locations with large quantities of objects (e.g., products) it can be difficult to identify the exact location of a physical object in a timely and efficient manner. Even where there is an existing computer tool or application that can provide an approximate location, such as an aisle number and storage bin identifier, etc., it still may not provide sufficient guidance for an individual requesting the object. Time and effort may still be required to search for the object, even within a target area, particularly since the object-requester is typically unfamiliar with the exact physical location of the object. The problem can be even more difficult where the object has been moved within the bin, the aisle or the location and the move was not recorded in existing database systems. In such cases, the requester might expend additional time, effort, and potentially resources, searching for the object's specific position and placement within a location.

SUMMARY

Certain shortcomings of the prior art are overcome and additional advantages are provided through the provision, in one or more aspects, of a computer program product for facilitating locating an object. The computer program product includes one or more computer-readable storage media having program instructions embodied therewith. The program instructions are readable by a processing circuit to cause the processing circuit to perform a method which includes obtaining a user-request, where the user-request is related to facilitating locating an object of interest, and identifying a target area containing the object. Further, the method includes providing augmentation data for rendering as an overlay on a user-device to assist in directing the user to the target area containing the object, and dynamically changing the augmentation data being provided for rendering as the overlay as the user-device is moved in relation to the target area containing the object to assist the user in locating the object within the target area.

Computer systems and computer-implemented methods relating to one or more aspects are also described and claimed herein. Further, services relating to one or more aspects are also described and may be claimed herein.

Additional features and advantages are realized through the techniques described herein. Other embodiments and aspects of the invention are described in detail herein and are considered a part of the claimed aspects.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

The accompanying figures, which are incorporated in and form a part of this specification, further illustrate the present invention and, together with the detailed description of the invention, serve to explain aspects of the present invention. Note in this regard that detailed descriptions of well-known systems, devices, techniques for machine learning, and other processing techniques, etc., are omitted so as to not unnecessarily obscure the invention in detail. Further, it should be understood that the detailed description and this specific example(s), while indicating aspects of the invention, are given by way of illustration only, and not limitation. Various substitutions, modifications, additions, and/or other arrangements, within the spirit or scope of the underlying inventive concepts will be apparent to those skilled in the art from this disclosure. Note further, that numerous inventive aspects and features are disclosed herein, and unless inconsistent, each disclosed aspect or feature is combinable with any other disclosed aspect or feature as desired for a particular application of the concepts disclosed.

Note also that illustrative embodiments are described below using specific code, designs, architectures, protocols, layouts, schematics or tools, only as examples, and not by way of limitation. Further, the illustrative embodiments are described in certain instances using particular hardware, software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

Figure 7:
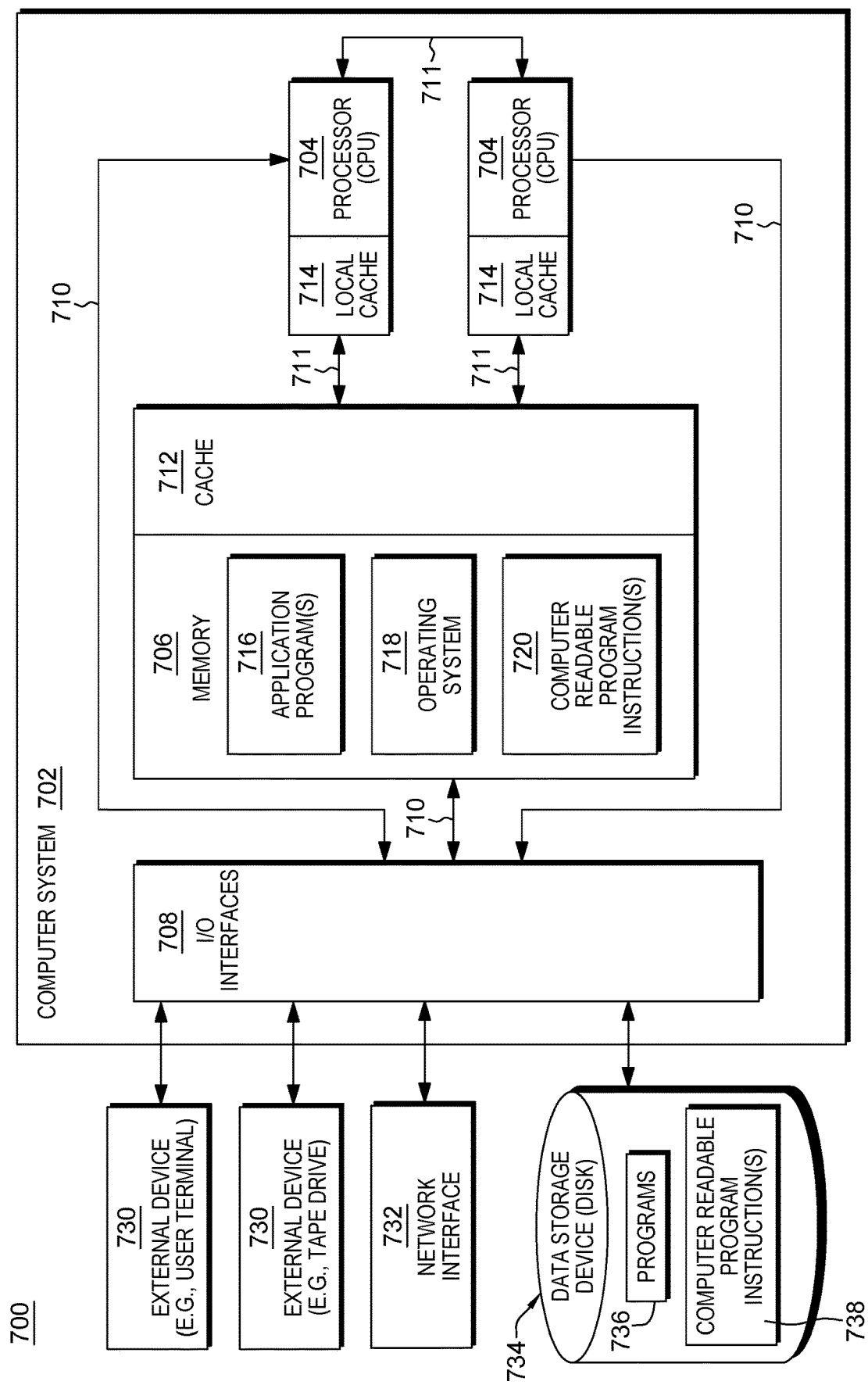
FIG. 7 depicts a further example of a computing environment to incorporate and use one or more aspects of the present invention.

As understood by one skilled in the art, program code, as referred to in this application, can include both hardware and software. For example, program code in certain embodiments of the present invention can include fixed function hardware, but other embodiments can utilize a software-based implementation of the functionality described. Certain embodiments combine both types of program code. One example of program code, also referred to as one or more programs or program instructions, can reside on hard disk drive 226 and/or in main memory 208 of computing environment 200 of FIG. 2. Another example of program code is depicted in FIG. 7 as one or more of application program(s) 716, and computer-readable program instruction(s) 720, stored in memory 706 of computing environment 700, as well as programs 736 and computer-readable program instruction(s) 738, stored in a data storage device 734 accessed by, or within, computing environment 700.

As noted, within storage and retail locations with large quantities of objects or products, such as grocery stores, hardware stores, warehouses, etc., it can be difficult to identify the exact location of a physical object desired. While there are existing mobile applications and other computer tools that provide approximate locations for objects in large storage locations, a more efficient system and process are desired to reduce search time and effort in actually locating an object of interest. As described herein, in one or more aspects, augmented intelligent analytics is utilized to provide a more comprehensive and efficient process for an optimal pathway for a user to locate and obtain an object within a location. Advantageously, in one or more embodiments, the augmented-reality object location-assist facility, system and process disclosed herein can assist in reducing time spent within a store or storage location, and thereby reduce time of possible exposure within the location to any airborne viruses, contaminants, etc., such as the COVID-19 virus.

Figure 1:
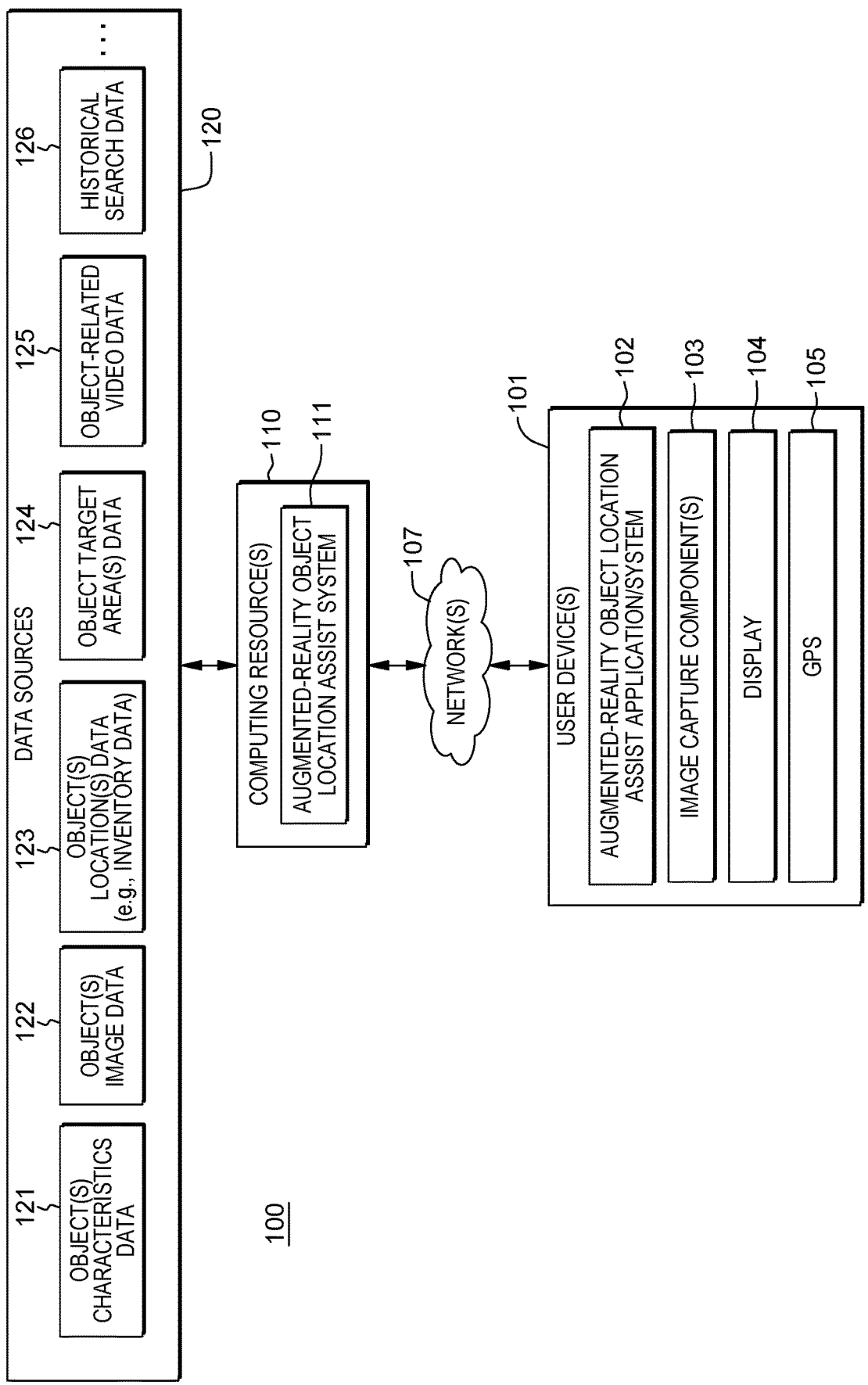
FIG. 1 depicts one embodiment of a computing environment to incorporate and use one or more aspects of the present invention.

By way of example, FIG. 1 depicts one embodiment of a computing environment 100 to incorporate and use one or more aspects of the present invention. As illustrated, computing environment 100 includes one or more user-devices 101 in communication across one or more networks 107 with one or more other computing resources 110. As one example, user-device(s) 101 is, or includes, a mobile electronic device, such as a smartphone, a laptop computer, a wireless multimedia device, a tablet, a personal digital assistant (PDA), a personal computer (PC), etc. Any such mobile device can have memory for storing instructions and data, as well as hardware, software, and firmware, and combinations thereof. In the embodiment of FIG. 1, user-device(s) 101 includes, by way of example, an augment-reality object location-assist application/system component 102, one or more image capture components 103, a display 104, a Global Positioning System (GPS) component 105, as well as other components conventional in the field of mobile electronic devices.

As illustrated in FIG. 1, user-device(s) 101 communicates across network(s) 107 with computing resource(s) 110 (such as one or more cloud-based computing resources) to facilitate implementing one or more aspects of the workflows disclosed herein. For instance, in the embodiment of FIG. 1, computing resource(s) 110 can include further aspects of an augmented-reality object location-assist system 111, such as an artificial intelligence or machine-learning-based location-assist model and system, in accordance with aspects disclosed herein. In one embodiment, computing resource(s) 110, and in particular, augmented-reality object location-assist system 111, is in operative communication with one or more data sources 120, such as one or more data sources providing object characteristics data 121, object image data 122, object location data 123 (such as inventory data), object target area data 124, video data related to locating an object within a location 125, historical search data relating to one or more objects 126, etc. In one or more embodiments, computing resource(s) 110 can access one or more data sources 120 across network(s) 107, as well.

By way of example, network(s) 107 can be, for instance, a telecommunications network, a local-area network (LAN), a wide-area network (WAN), such as the Internet, or a combination thereof, and can include wired, wireless, fiber-optic connections, etc. The network(s) can include one or more wired and/or wireless networks that are capable of receiving and transmitting data, including data packets. In one or more embodiments, the data includes data such as disclosed herein for implementing an augmented-reality object location-assist system and process such as disclosed.

Figure 2:
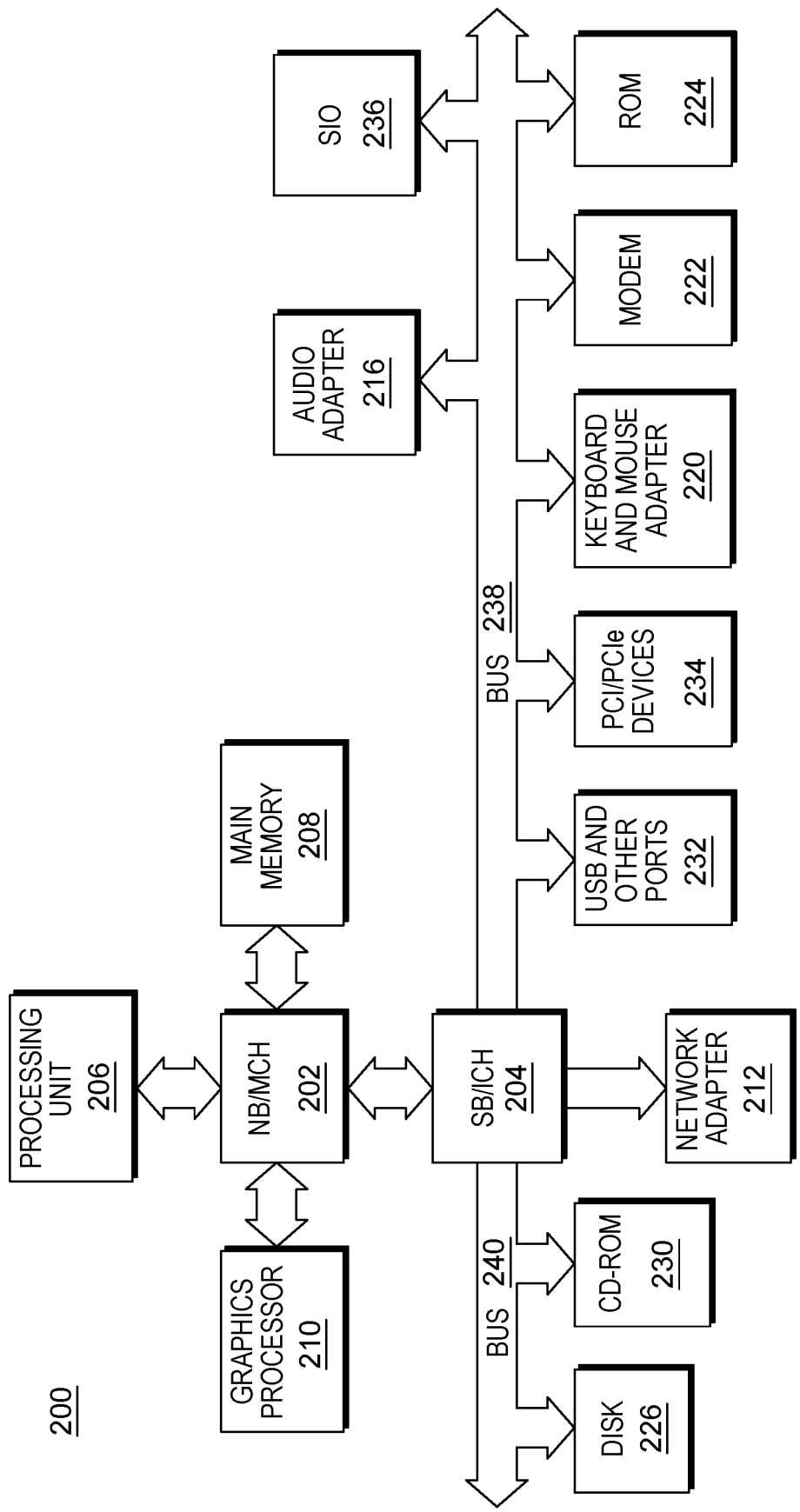
FIG. 2 depicts a further example of a computing environment to incorporate and use one or more aspects of the present invention.

Referring to FIG. 2, a block diagram of a computing environment, or data processing system 200, in which illustrative embodiments can be implemented is shown by way of further example. Data processing system 200 is an example of a computing device/resource, such as user-device(s) 101, and/or computer resource(s) 110 in FIG. 1, or another type of device in which computer-usable program code or instructions implementing processes such as disclosed herein can be located, in one or more embodiments.

In the depicted example, data processing system 200 includes a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 can contain one or more processors and even can be implemented using one or more heterogeneous processor systems. Graphics processor 210 can be coupled to the NB/MCH through an accelerated graphics port (AGP), for example.

In the depicted example, a local area network (LAN) adapter 212 is coupled to south bridge and I/O controller hub 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices can include, for example, Ethernet adapters, add-in cards, and PC cards for notebook computers. PCI uses a card bus controller, while PCIe does not. ROM 224 can be, for example, a flash binary input/output system (BIOS). Hard disk drive 226 and CD-ROM 230 can use, for example, an integrated drive electronics (IDE) or serial advanced technology attachment (SATA) interface. A super I/O (SIO) device 236 can be coupled to south bridge and I/O controller hub 204.

An operating system runs on processing unit 206 and coordinates and provides control of various components within data processing system 200 in FIG. 2. The operating system can be a commercially available operating system. An object oriented programming system can run in conjunction with the operating system and provide calls to the operating system from programs or applications executing on data processing system 200.

Instructions for the operating system, the object-oriented programming system, and applications or programs can be located on storage devices, such as hard disk drive 226, and can be loaded into main memory 208 for execution by processing unit 206. The processes of the illustrative aspects discussed herein can be performed by processing unit 206 using computer implemented instructions, which can be located in a memory such as, for example, main memory 208, read only memory 224, or in one or more peripheral devices.

Note that the hardware embodiment depicted in FIG. 2 can vary depending on the desired implementation. Other internal hardware or peripheral devices, such as one or more speakers, microphones, flash memory, equivalent non-volatile memory, or optical disk drives and the like, can be used in addition to or in place of certain hardware depicted. Also, the processes of the illustrative aspects described herein can be applied to other hardware environments, such as to a multiprocessor data processing system.

In one or more implementations, data processing system 200 can be an electronic device or a server computer resource, and can be generally configured with flash memory to provide non-volatile memory for storing operating system files and/or user-generated data. A bus system can include one or more buses, such as a system bus, an I/O bus and a PCI bus. Of course the bus system can be implemented using any type of communications fabric or architecture that provides for a transfer of data between different components or devices attached to the fabric or architecture. A communications unit can include one or more devices used to transmit and receive data, such as a modem or a network adapter. A memory can be, for example, main memory 208 or a cache such as found in north bridge and memory controller hub 202. A processing unit can include one or more processors or CPUs. Those skilled in the art should note that the depicted system example of FIG. 2, as well as other examples referenced herein, are not meant to imply architectural limitations. As noted, data processing system 200 can be implemented as part of user-device(s) 101 and/or computer resource(s) 110 in FIG. 1, such as a part of a smartphone, tablet computer, laptop computer, desktop computer, server, personal digital assistant (PDA), wireless computer, server, mainframe system, etc.

As noted, the illustrated hardware of FIG. 2 can vary depending on the implementation. Other internal hardware or peripheral devices, such as flash memory, equivalent non-volatile memory, or optical disk drives and the like, can be used in addition to or in place of the hardware depicted in FIG. 2. In addition, one or more processes of the illustrative embodiments can be applied to a multiprocessor data processing system.

Figure 3:
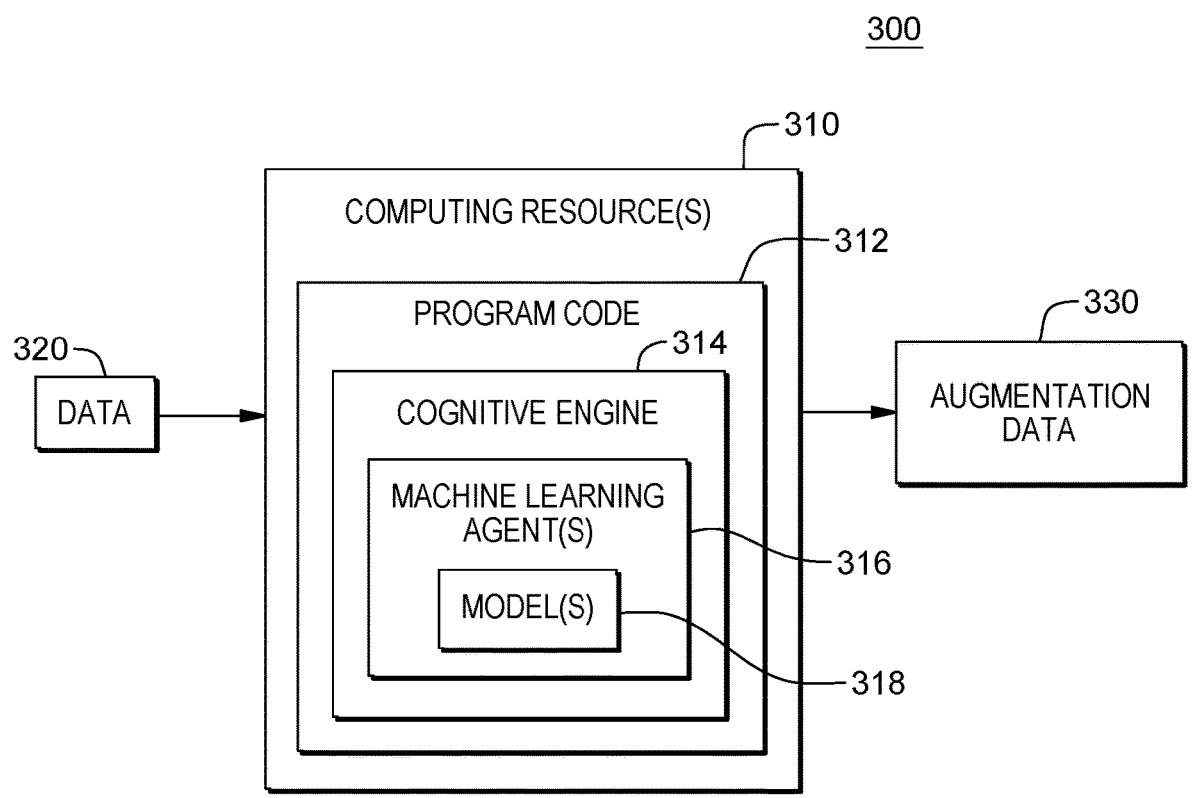
FIG. 3 illustrates another example of a computing environment to incorporate and use one or more aspects of the present invention.

FIG. 3 depicts a further embodiment of a computing environment or system 300, incorporating, or implementing, certain aspects of an embodiment of the present invention. In one or more implementations, system 300 can be part of a computing environment, such as computing environment 100 described above in connection with FIG. 1 and/or computing environment 200 described above in connection with FIG. 2. System 300 includes one or more computing resources 310 (and/or user-devices) that execute program code 312 that implements a cognitive engine 314, which includes one or more machine-learning agents 316, and one or more machine-learning models 318. Data 320, such as the data discussed herein, is used by cognitive engine 314, to train model(s) 318, to (for instance) ascertain one or more parameters of a probability score related to augmentation data, and/or to generate the augmentation data 330, etc., based on the particular application of the machine-learning model. In implementation, system 300 can include, or utilize, one or more networks for interfacing various aspects of computing resource(s) 310, as well as one or more data sources providing data 320, and one or more systems receiving the augmentation data 330 of machine-learning model(s) 318. By way of example, and as noted, the network can be, for instance, a telecommunications network, a local-area network (LAN), a wide-area network (WAN), such as the Internet, or a combination thereof, and can include wired, wireless, fiber-optic connections, etc. The network(s) can include one or more wired and/or wireless networks that are capable of receiving and transmitting data, including training data for the machine-learning model, and output of the machine-learning model, such as the augmentation data discussed herein.

In one or more implementations, computing resource(s) 310 houses and/or executes program code 312 configured to perform methods in accordance with one or more aspects of the present invention. By way of example, computing resource(s) 310 can be an object location-assist system server, or other computing-system-implemented resource(s). Further, for illustrative purposes only, computing resource(s) 310 in FIG. 3 is depicted as being a single computing resource. This is a non-limiting example of an implementation. In one or more other implementations, computing resource(s) 310, by which one or more aspects of machine-learning processing such as discussed herein are implemented, could, at least in part, be implemented in multiple separate computing resources or systems, such as one or more computing resources of a cloud-hosting environment, by way of example.

Briefly described, in one embodiment, computing resource(s) 310 can include one or more processors, for instance, central processing units (CPUs). Also, the processor(s) can include functional components used in the integration of program code, such as functional components to fetch program code from locations in such as cache or main memory, decode program code, and execute program code, access memory for instruction execution, and write results of the executed instructions or code. The processor(s) can also include a register(s) to be used by one or more of the functional components. In one or more embodiments, the computing resource(s) can include memory, input/output, a network interface, and storage, which can include and/or access, one or more other computing resources and/or databases, as required to implement the machine-learning processing described herein. The components of the respective computing resource(s) can be coupled to each other via one or more buses and/or other connections. Bus connections can be one or more of any of several types of bus structures, including a memory bus or a memory controller, a peripheral bus, an accelerated graphics port, and a processor or local bus, using any of a variety of architectures. By way of example, but not limitation, such architectures can include the Industry Standard Architecture (ISA), the micro-channel architecture (MCA), the enhanced ISA (EISA), the Video Electronic Standard Association (VESA), local bus, and peripheral component interconnect (PCI). As noted, examples of a computing resource(s) or a computer system(s) which can implement one or more aspects disclosed herein are described further herein with reference to FIG. 2, as well as with reference to FIGS. 7-10.

As noted, program code 312 executes, in one implementation, a cognitive engine 314 which includes one or more machine-learning agents 316 that facilitate training one or more machine-learning models 318. The machine-learning models are trained using training data that can include a variety of types of data, depending on the model and the data sources. In one or more embodiments, program code 312 executing on one or more computing resources 310 applies machine-learning algorithms of machine-learning agent 316 to generate and train the model(s), which the program code then utilizes to predict, for instance, one or more parameters for determining the augmentation data. In an initialization or learning stage, program code 312 trains one or more machine-learning models 318 using obtained training data that can include, in one or more embodiments, object location-related data associated with determining the augmentation data for rendering as an overlay on the user-device.

As noted, training data used to train the model (in embodiments of the present invention) can include a variety of types of data, such as data generated by one or more network devices or computer systems in communication with the computing resource(s). Program code, in embodiments of the present invention, can perform machine-learning analysis to generate data structures, including algorithms utilized by the program code to predict object location relative to a user-device, and/or perform a machine-learning action related to the augmentation data. As known, machine-learning (ML) solves problems that cannot be solved by numerical means alone. In an ML-based example, program code extract features/attributes from training data, which can be stored in memory or one or more databases. The extracted features are utilized to develop a predictor function, h(x), also referred to as a hypothesis, which the program code utilizes as a machine-learning model. In identifying machine-learning model, various techniques can be used to select features (elements, patterns, attributes, etc.), including but not limited to, diffusion mapping, principle component analysis, recursive feature elimination (a brute force approach to selecting features), and/or a random forest, to select the attributes related to the particular model. Program code can utilize a machine-learning algorithm to train machine-learning model (e.g., the algorithms utilized by program code), including providing weights for conclusions, so that the program code can train any predictor or performance functions included in the machine-learning model. The conclusions can be evaluated by a quality metric. By selecting a diverse set of training data, the program code trains the machine-learning model to identify and weight various attributes (e.g., features, patterns) that correlate to enhanced performance of the machine-learned model.

Some embodiments of the present invention can utilize IBM Watson® as a learning agent. IBM Watson® is a registered trademark of International Business Machines Corporation, Armonk, New York, USA. In embodiments of the present invention, the respective program code can interface with IBM Watson® application program interfaces (APIs) to perform machine-learning analysis of obtained data. In some embodiments of the present invention, the respective program code can interface with the application programming interfaces (APIs) that are part of a known machine-learning agent, such as the IBM Watson® application programming interface (API), a product of International Business Machines Corporation, to determine impacts of data on the machine-learning model, and to update the model, accordingly.

In some embodiments of the present invention, the program code utilizes a neural network to analyze training data and/or collected data to generate an operational model or machine-learning model. Neural networks are a programming paradigm which enable a computer to learn from observational data. This learning is referred to as deep learning, which is a set of techniques for learning in neural networks. Neural networks, including modular neural networks, are capable of pattern (e.g., state) recognition with speed, accuracy, and efficiency, in situations where datasets are mutual and expansive, including across a distributed network, including but not limited to, cloud computing systems. Modern neural networks are non-linear statistical data modeling tools. They are usually used to model complex relationships between inputs and outputs, or to identify patterns (e.g., states) in data (i.e., neural networks are non-linear statistical data modeling or decision-making tools). In general, program code utilizing neural networks can model complex relationships between inputs and outputs and identified patterns in data. Because of the speed and efficiency of neural networks, especially when parsing multiple complex datasets, neural networks and deep learning provide solutions to many problems in multi-source processing, which program code, in embodiments of the present invention, can utilize in implementing a machine-learning model, such as described herein.

Disclosed herein, in one or more aspects, are computer program products, computer systems and methods for providing augmented-reality object location assistance to a user. By way of example, FIG. 4 depicts one embodiment of a workflow illustrating certain aspects of one or more embodiments of the present invention.

Figure 4:
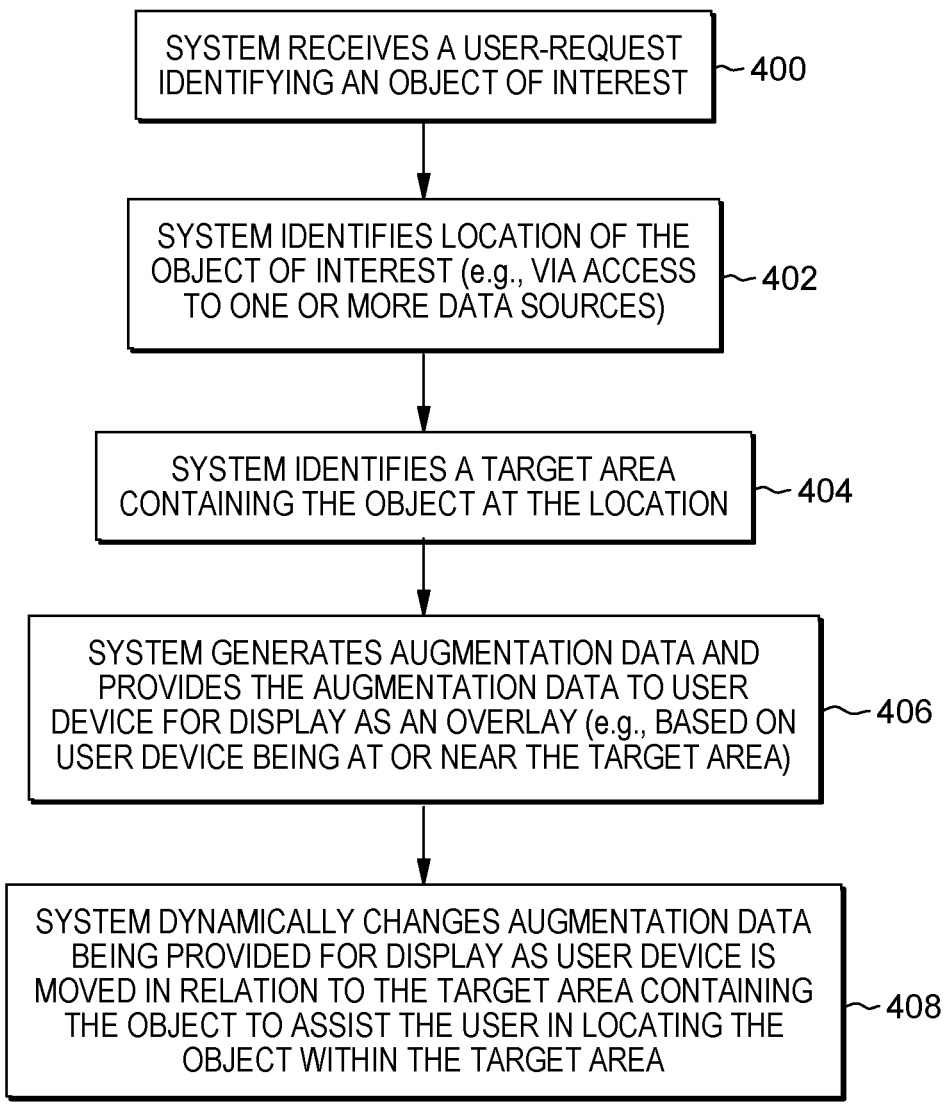
FIG. 4 depicts a workflow illustrating certain aspects of one or more embodiments of the present invention.

Referring to FIG. 4, program code executing on one or more systems receives a user-request 400. The user-request is related to facilitating locating an object of interest. The system program code identifies a location of the object of interest 402. For instance, via access to one or more data sources, the system determines that an object of interest is located at one or more stores close to the user. For a selected location of the object, the system identifies a target area containing the object within that location 404. For instance, the target area can specify a particular aisle, bin, or other region within the location where the object is, or should be, located. In accordance with one or more aspects disclosed herein, the system generates augmentation data, for instance, via machine learning, and provides the augmentation data to the user's device (e.g., the user's mobile electronic device) for display as an overlay 406. In one embodiment, the augmentation data for display as overlay can be based on the distance between the user-device and the object of interest within the target area. Advantageously, the system dynamically changes the augmentation data being provided for display as the user-device is moved in relation to the object; for instance, in relation to the target area containing the object, to assist the user in locating the object within the target area 408. In this way, the augmentation data provided for display as an overlay on the user's display device functions as a homing indicator to allow the user to more quickly locate and obtain the object of interest.

In one or more other aspects, the augmented-reality objection location-assist facility disclosed can receive an image being captured by the user-device at the user's current location, and providing the augmentation data can include determining, based at least in part on the received image, the augmentation data for rendering as the overlay to assist in directing the user to the target area containing the object. In one embodiment, the determining includes using image recognition to determine whether the object of interest is within the received image from the user-device.

In one or more implementations, the system program code can further predict, via machine learning, distance between the user-device and the object of interest within the target area, with the predicting being based on multiple specified attributes of the object of interest.

In one or more embodiments, the program code further determines a probability score related to location of the object of interest, where the probability score is used in providing the augmentation data for rendering as the overlay on the user-device. For instance, the probability score can include a summation of identifiable attributes of multiple specified attributes of the object of interest, where the identifiable attributes are identifiable within an image captured by the user-device. In one embodiment, the summation for the probability score further includes a determined distribution number for the object of interest being identifiable within the image captured by the user-device.

In one or more embodiments, the augmentation data provided for rendering as the overlay can include a color-coded indication to assist the user in locating the object within the target area. Further, the dynamically changing of the augmentation data can include dynamically changing the color-coded indication as the user-device is moved in relation to the target area containing the object of interest. In this manner, the augmented-reality object location-assist system provides an overlay which operates as a homing indication to readily direct the user to the object of interest.

Disclosed herein, in one or more embodiments, is an augmented-reality object location-assist system and method to facilitate identifying the physical location of a target object within a location having multiple objects of similar and/or dissimilar characteristics. In one embodiment, a model with a machine-learning component is utilized to drive the process to facilitate locating the target object. The model can be dynamically updated in real-time as additional data is available. In one or more embodiments, cognitive and augmented-reality features are utilized by the augmented-reality object location-assist facility, and depending on the implementation, can use blockchain technology in obtaining one or more of the data inputs.

Disclosed herein, in one or more embodiments, is a novel algorithm, and multi-variable scoring system with probability scores and machine-learning-assisted simulations to guide a user to a probable location of an object via images, and other data sources. The augmented-reality object location-assist system can facilitate finding any object of interest within, for instance, a storage or retail location. With machine learning, the model is dynamically improved over time as more data becomes available.

Figure 5:
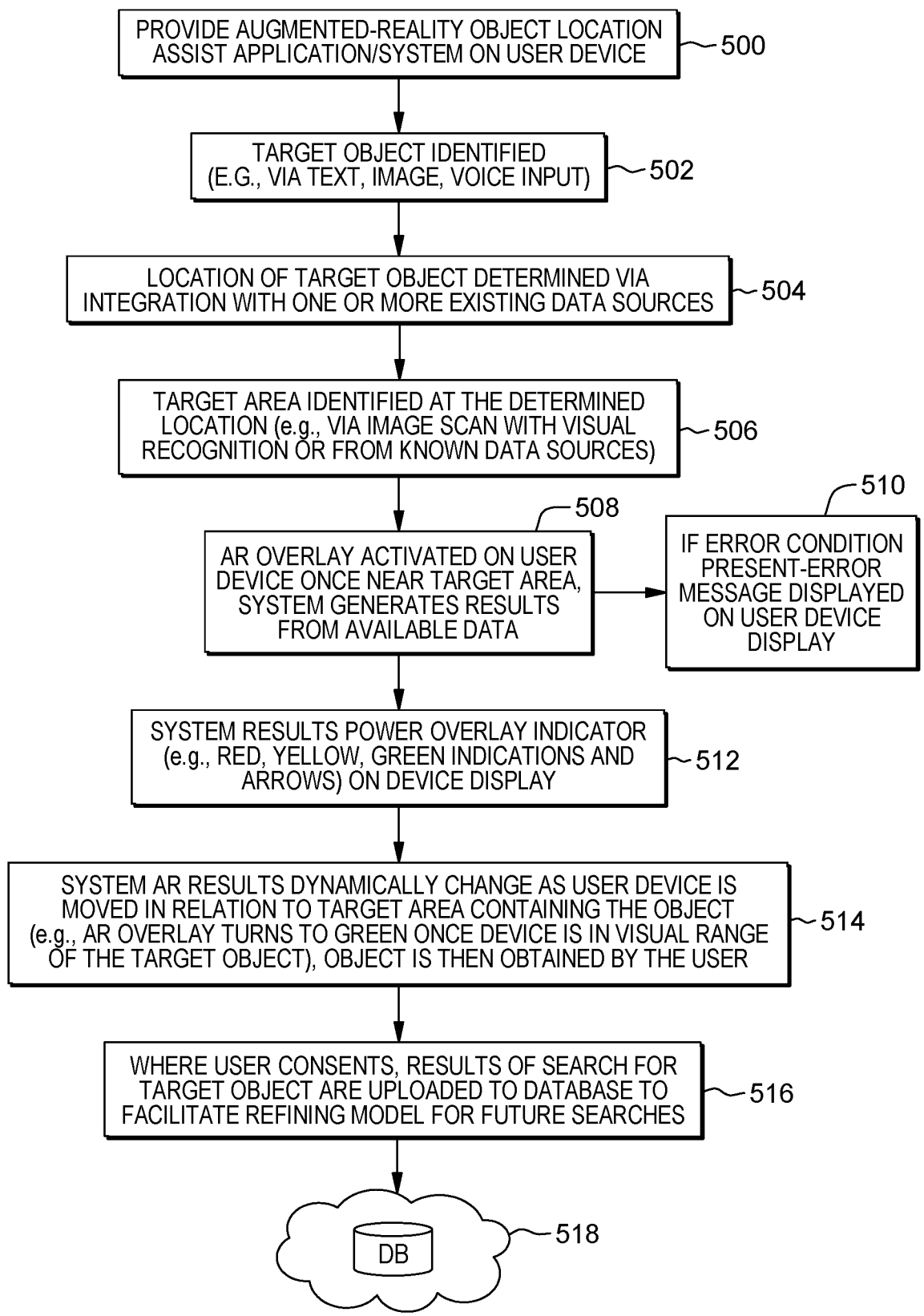
FIG. 5 depicts a further workflow illustrating certain aspects of one or more embodiments of the present invention.

By way of further example, FIG. 5 depicts another workflow illustrating certain aspects of one or more embodiments of the present invention. As noted, the augmented-reality object location-assist system or facility disclosed herein can be implemented as a component on a variety of systems. In one embodiment, the augmented-reality object location-assist facility can be provided as an application or system on a user-device 500. For instance, the augmented-reality object location-assist facility can be implemented as a component of a computer program application, and accessed via a mobile application, or a computer such as a laptop, to provide a user interface to utilize the facility.

As illustrated, the target object is identified, for instance, by the system obtaining a user-request, where the user-request relates to facilitating locating an object of interest 502. In one example, the target object is selected by a user or requester by imputing identifying information into the mobile application, such as via a text, image, voice input, etc. In one embodiment, a web search can be used to obtain an image or document for uploading an object to the application, or voice or text input can identify the object. The target object's characteristics are recorded, in one embodiment, in a local or web-connected database or storage device associated with the augmented-reality object location-assist system. Recorded characteristics can include, in one embodiment, object name, object color, dimensions, identifying characteristics (e.g., font of text on item, unique logo, etc.), unique identifiers associated with the object, such as object identification code (e.g., RFID code, barcode), etc.

In one or more embodiments, the location of the target object is determined via integration with one or more existing data sources 504. For instance, the object's approximate storage location can be determined as the closest storage location that houses the object.

In one embodiment, once the user arrives at the approximate location of the object of interest, the augmented-reality object location-assist system can identify a target area at the determined location where the object of interest is likely located 506. For instance, the augmented-reality object location-assist system can interface with existing applications, maps, location inventory, or other sources of existing information about the storage location or retail location where the target object resides. In one embodiment, where the user or requester of the target object enters in close proximity (e.g., 100 feet) of the target object's assumed location according to available data, a message is generated prompting the user to activate the user-device camera. The "target area" (e.g., specific shelf or section of shelves, or bay, etc.) for the target object can be identified to facilitate narrowing the search area and reducing search time, assuming that the data is available. This can be accomplished via different processes. For instance, once the user-device camera is activated, a low-resolution mode can be activated in order to capture low-resolution images of the general area (e.g., aisle in a storage location) where the user is currently located, and these images can be uploaded to, for instance, cloud-based computing resources, for analysis via visual recognition APIs to search for identifying characteristics of the target object. Once located, a message can be displayed indicating where the target area may be. In addition, or as a substitute to image analysis, existing data sources can be consulted by the augmented-reality object location-assist system, such as store inventory applications, store maps, or other data sources, to facilitate identifying the target area for the target object. For instance, once identified, a message indicating "scan aisle 55, bay 14" could be displayed on the user-device to facilitate locating the object of interest.

Once the target area is identified, augmentation data for rendering as an overlay can be provided to the user-device for display on the device's display screen 508. In one embodiment, the user-device camera can be utilized to display a color-coded "homing" indication on the display via the augmented-reality overlay to indicate whether the user is approaching the object or moving away from the object of interest. Should an error condition occur during this processing, an error message can be displayed on the user-device display screen 510.

In one or more embodiments, the system results can power an overlay indicator that depicts different colors, depending upon how close the user is to the object of interest 512. For instance, red, yellow and green indications can be utilized, such as in the example of FIGS. 6A-6C, where the overlay color progresses as the user moves closer to the object of interest. In this manner, the system augmented-reality results displayed as the overlay dynamically change as the user-device is moved in relation to the target area containing the object 514. For instance, the augmented-reality overlay turns different colors depending on the relative distance. In one embodiment, where the user is close to the object, the color green can be used to show that the user-device is in visual range of the target object, which allows the user to then readily obtain the object of interest.

Figure 6C:
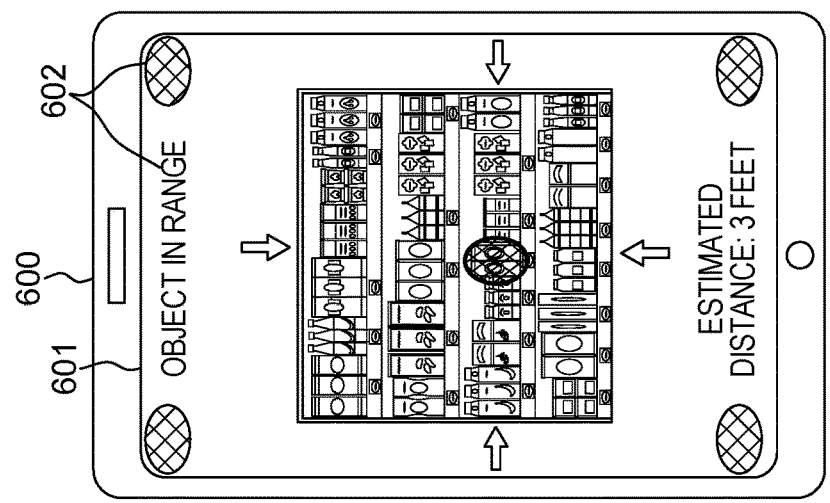
FIGS. 6A-6C illustrate one embodiment of dynamically changing augmentation data rendered as an overlay on a user-device display to assist in locating an object within a target area, in accordance with one or more aspects of the present invention.
Figure 6B:
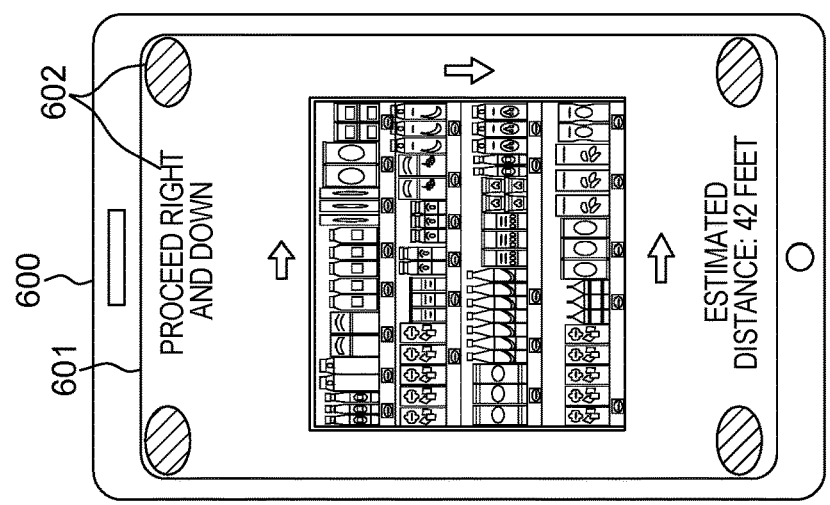
Figure 6A:
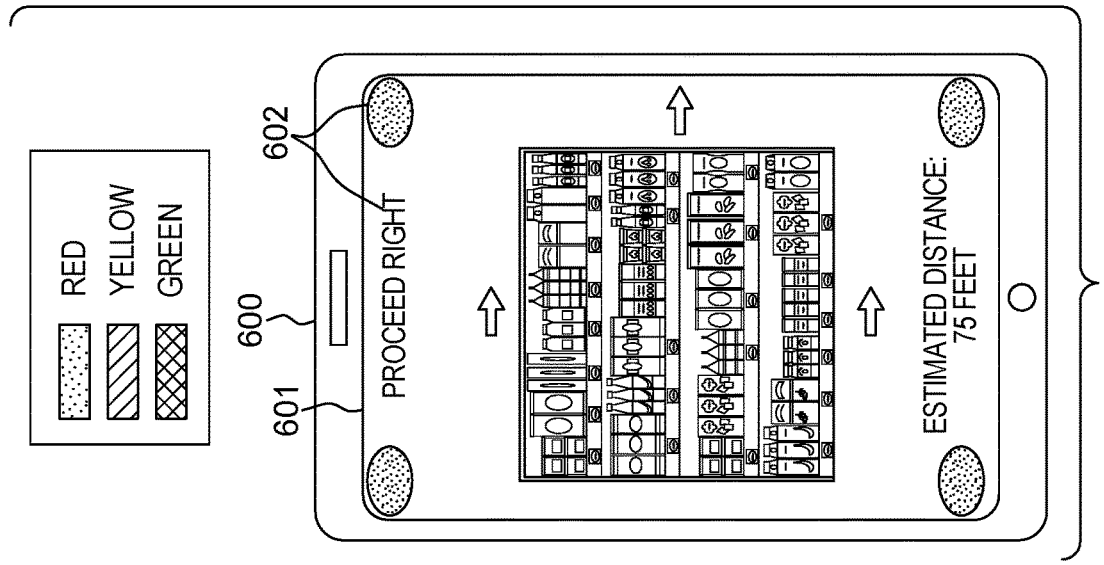

In one or more embodiments, along with providing dynamically-changing color indications, arrows, such as color-coded arrows, can be provided to indicate direction (e.g., left, right, up, down), with directional data being pulled from one or more data sources and information on the inventory, setup and layout of the location where the target object is found. An example of this is also depicted in FIGS. 6A-6C, where the directional arrows facilitate guiding the user. Note than in FIG. 6C, four inward-facing arrows direct the user's attention to the specific location of the object of interest, which can also be circled on the display screen to assist the user further. In one embodiment, generic indicators on the augmented-reality overlay can be the color red for where the user or user-device is far from the target object, yellow where the user-device is moving closer to the target object, and green where the object of interest is in range of the device's camera and/or sensors. As noted, the generic indicators can be supplemented with directional arrows and optional text directions, such as in the example of FIGS. 6A-6C, where desired.

In one or more embodiments, the augmented-reality object location-assist facility includes an algorithm to assist in generating, for instance, the color-coded indicators, and to provide a confidence-level score for the predicted proximity to the target object. Multiple variables can be included in the algorithm (e.g., from a list of variables that a user can select for each target object). These variables can include, for instance, an object identification code (e.g., RFID/barcode) of the desired item, where "0" means NO (not identified), and "1" is YES (identified), an object identification code of objects that are known to be located near the object, according to available data such as inventory data, a name of an item, an expected color of an item, etc. In addition, relative distance variables from the user to the expected location of the target object (direction right, left, up, down), "0" for NO (meaning that the object is not within range of the user-device camera), and "1" for YES (meaning that the object is within range of the user-device camera). Further, object dimensions, measured, for instance, by device sensors, can be used including height, weight, depth, size, etc., with "0" indicating no match, and "1" indicating a match of expected object dimensions.

In one or more embodiments, using the basic algorithm noted, a probability score can be determined that the target object should be visible to the user-device camera (e.g., in the augmented-reality overlay) on a distribution between 0 and 1. The more 1 values recorded from the multiple characteristics considered, the closer the probability that the desired object should be visible to the device's camera, and vice versa. The more 0 values recorded from the above variable list will result in a lower probability score.

In one or more implementations, a cloud-based machine-learning component is utilized, as described herein. In one embodiment, the cloud-based machine-learning component runs simulations of the available data to generate, for instance, a further probability score on a distribution between 0 and 1 that the item should be within the user-device camera's visible range, with scores closer to 0 indicating further away from the object of interest, and scores closer to 1 indicating that the item should be close to the device camera's visible range. The variables the machine learning simulation could consider include: available data on the target object as noted above, possibly including object identification (RFID/barcode ID), object name, object characteristics such as height, weight, shape, color, object identification code (e.g., RFID/barcode ID) of expected objects adjacent or near the target object (according to available data sources), data on the results of past searches for the target object including, for instance, the exact position (e.g., GPS coordinates or other data) of the target object from other searches as uploaded to the cloud, results of past searches/crowdsourcing data for past searches (e.g., was the target object located, 0 for NO, and 1 for YES), and time taken to locate the target object once the search begins from past searches. In one or more embodiments, the simulations can be run dynamically as new data becomes available.

As noted, in one embodiment, the components of the algorithm can be combined together to form the augmentation data for display as the overlay (e.g., to form a color-coding overlay) that is displayed visually on the user-device. In one or more embodiments, the results of the algorithm can fall into a tiered scoring system. For instance, in one iteration, the scoring system can include three levels, which can be equated visually to the colors read, yellow or green on the augmented-reality display.

As noted with respect to FIG. 5, in the case where the algorithm returns an error, or there is no result (e.g., algorithm returns 0), or the target object is out of range according to available data, resulting in an error condition, an error message can be displayed 510 indicating no result is possible at the given moment in time with the available data. A visual message can also be displayed on the user-device to that effect.

As depicted in FIG. 5, where the user consents, the results of the search for a target object can be uploaded to a system database to facilitate further refining the model for future searches 516, 518. Note in this regard that, to the extent implementation of the present invention collects, stores, or employs personal information provided by, or obtained from, individual users (for instance, current locations, obtained objects, or other personally identifying information, etc.), such information shall be used in accordance with all applicable laws concerning protection of personal information. Additionally, the collection, storage and use of such information may be subject to consent of the individual to such activity, for example, through "opt-in" or "opt-out" processes, as may be appropriate for the situation and type of information. Storage and use of personal information may be of any appropriately secure manner reflective of the type of information, for example, through various encryption and anonymization techniques. In one or more embodiments, anonymization processing is employed to ensure that substantially no personal information is used by the augmented-reality object location-assist system disclosed herein.

To summarize, a novel algorithm and multi-variable scoring approach is provided to establish probability scores with machine-learning-assisted simulations to guide a user to a probable location of an object of interest via images, and other data sources. In one or more embodiments, the probability score can be ascertained as:

(Variable 1) 0/1+(Variable 2) 0/1+(Variable 3) 0/1 . . . (Variable N) 0/1+(Probability Distribution) 0.0 to 1.0+(Cloud-based machine-learning-assisted simulation of combinations of variables) 0.0 to 1.0.

Using the above algorithm, the resultant score can be classified into a tiered range, such as a 3-tier range based on the dividing the highest possible score for the number of available datapoints by 3. The three tiers can then correspond to, in one embodiment, colors on the augmented-reality overlay, such as red, yellow and green. As noted, direction arrows can also be utilized on the augmented-reality overlay to guide the user towards the target object based on the available data.

As a further operational example, assume that the target object is a spice container at a retail store location. The user opens a mobile application on their user-device that is running the augmented-reality object location-assist system or facility. The user takes a picture of the particular type of spice to be obtained (which could be an empty container). The image of the spice container, including the UPC barcode captured with the picture, is uploaded to the mobile application, which connects to one or more cloud-powered servers to conduct a web search for the nearest location of the target object relative to the user's GPS coordinates, and displays the location to the user. The user proceeds to the approximate location of the target object (e.g., retail store) and enters the store.

In one embodiment, the user can utilize the augmented-reality object location-assist application, which can interface with the store's native application, to display the approximate item location in the store. The user selects, in one embodiment, four variables from a list of variables to include in the search algorithm for this particular target object. The variables selected in this example could be: object ID code (UPC barcode), object dimension match (size, weight, height, shape), object name, and object ID codes (UPC barcode) of objects expected near the target object according to available data (e.g., store inventory data). The user proceeds to the approximate object location within the store, and arrives at, in one embodiment, a large, long shelf full of spices and seasonings of all different sizes, shapes and brand names and formulas. In one embodiment, the augmented-reality object location-assist system application prompts the user requesting permission to activate the user-device camera. The user activates the camera and points the user-device at the long shelf of products. The object location-assist algorithm of the invention begins to determine a score, which is dynamically updated in real-time as the user moves the camera. The basic algorithm can be scored at one moment as such:

(Object barcode present) 0+(object size, height and shape) 1+(object name) 0+(barcode of items expected near target object) 1=2.

The basic score is obtained by adding up the scores of variables (0 for NO, and 1 for YES)=2. The basic probability score is items with 1 divided by the total number of variables=2/4=0.50. The machine-learning simulation-powered probability score is, in one embodiment, running all the combinations of variables, plus factoring in any historical data from past searches of the item, with 0 for NO and 1 for YES for all variables, and the results of the simulations could result in a probability of, for instance, 0.37.

The overall algorithm in the example scenario is thus (basic score) 2+(probability) 0.50+(machine-learning-assisted simulation probability) 0.37=2.87. In one embodiment, the scoring system is dynamically dependent on the number of variables available in the basic score. The general assumption built into the algorithm for the scoring system is to divide the possible score into ranges, for instance, into three tiers. In this example, there are 4 variables in the basic score, and 2 probability sub-scores, so the scoring system could be: 0-2.99=low, which would be displayed as a red indicator in the augmented reality overlay on the user-device, 3-4.9=medium, which would be displayed as a yellow indicator in the overlay on the user-device, and 5-6=high, which can be displayed as a green indicator in the augmented-reality overlay on the user-device.

In the example scenario, at this moment in the search, the user receives a red indicator on the augmented-reality overlay of the device because the accumulated score is in the low tier (0-2.99). The user, in one embodiment, also sees arrow indications which direct movement of the device camera, depending on data available. Further, in one implementation, the user can also see an estimated distance from the target object, obtained from existing available data sources, if applicable, via a message displayed on the user-device, such as "estimated distance 37 feet".

As the user moves the device up and down the aisle, the score updates in real-time, as the augmented reality data updates and changes. Further, the visual indicator on the augmented-reality overlay can move from, for instance, red to yellow to green, and back to yellow, depending on the user-device location and movement. Once the indicator progresses to green, the user stops moving the user-device and allows the device to take more detailed images or video, with a further visual indicator appearing on the screen if the target object is depicted in the image. Once located, the user can obtain the object of interest and ensure it is the same object with the same barcode and name as the target object. In one embodiment, the user can then click on the user-device that the task is complete, and the target object has been found. An option can then appear, asking if the user would like to upload the results of the search to assist refining future search results for others for the same object. If the user selects "yes", then the results are updated to the remote database, such as a cloud-based database, to facilitate power future machine-learning simulations and searches.

One embodiment of a computing environment to incorporate and use one or more aspects of the present invention is described with reference to FIG. 7. As an example, the computing environment is based on the IBM® z/Architecture® instruction set architecture, offered by International Business Machines Corporation, Armonk, New York. One embodiment of the z/Architecture instruction set architecture is described in a publication entitled, "z/Architecture Principles of Operation," IBM Publication No. SA22-7832-12, Thirteenth Edition, September 2019, which is hereby incorporated herein by reference in its entirety. The z/Architecture instruction set architecture, however, is only one example architecture; other architectures and/or other types of computing environments of International Business Machines Corporation and/or of other entities may include and/or use one or more aspects of the present invention. z/Architecture and IBM are trademarks or registered trademarks of International Business Machines Corporation in at least one jurisdiction.

Referring to FIG. 7, a computing environment 700 includes, for instance, a computer system 702 shown, e.g., in the form of a general-purpose computing device. Computer system 702 can include, but is not limited to, one or more general-purpose processors or processing units 704 (e.g., central processing units (CPUs)), a memory 706 (a.k.a., system memory, main memory, main storage, central storage or storage, as examples), and one or more input/output (I/O) interfaces 708, coupled to one another via one or more buses and/or other connections. For instance, processors 704 and memory 706 are coupled to I/O interfaces 708 via one or more buses 710, and processors 704 are coupled to one another via one or more buses 711.

Bus 711 is, for instance, a memory or cache coherence bus, and bus 710 represents, e.g., one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

As examples, one or more special-purpose processors (e.g., neural network processors) (not shown) can also be provided separate from but coupled to the one or more general-purpose processors and/or can be embedded within the one or more general-purpose processors. Many variations are possible.

Memory 706 can include, for instance, a cache 712, such as a shared cache, which may be coupled to local caches 714 of processors 704 and/or to neural network processor, via, e.g., one or more buses 711. Further, memory 706 can include one or more programs or applications 716 and at least one operating system 718. An example operating system includes on IBM® z/OS® operating system, offered by International Business Machines Corporation, Armonk, New York. z/OS is a trademark or registered trademark of International Business Machines Corporation in at least one jurisdiction. Other operating systems offered by International Business Machines Corporation and/or other entities may also be used. Memory 706 can also include one or more computer readable program instructions 720, which can be configured to carry out functions of embodiments of aspects of the present invention.

Moreover, in one or more embodiments, memory 706 can include processor firmware (not shown). Processor firmware can include, e.g., the microcode or millicode of a processor. It can include, for instance, the hardware-level instructions and/or data structures used in implementation of higher level machine code. In one embodiment, it includes, for instance, proprietary code that is typically delivered as microcode or millicode that includes trusted software, microcode or millicode specific to the underlying hardware and controls operating system access to the system hardware.

Computer system 702 can communicate via, e.g., I/O interfaces 708 with one or more external devices 730, such as a user terminal, a tape drive, a pointing device, a display, a microphone, and one or more data storage devices 734, etc. A data storage device 734 can store one or more programs 736, one or more computer readable program instructions 738, and/or data, etc. The computer readable program instructions may be configured to carry out functions of embodiments of aspects of the invention.

Computer system 702 can also communicate via, e.g., I/O interfaces 708 with network interface 732, which enables computer system 702 to communicate with one or more networks, such as a local area network (LAN), a general wide area network (WAN), and/or a public network (e.g., the Internet), providing communication with other computing devices or systems.

Computer system 702 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 702. Examples, include, but are not limited to: microcode or millicode, device drivers, redundant processing units, external disk drive arrays, RAID systems, tape drives, and data archival storage systems, etc.

Computer system 702 can be operational with numerous other general-purpose or special-purpose computing system environments or configurations. Examples of well-known computing systems, environments, and/or configurations that are suitable for use with computer system 702 include, but are not limited to, personal computer (PC) systems, mobile devices, handheld or laptop devices, server computer systems, thin clients, thick clients, multiprocessor systems, microprocessor-based systems, set top boxes, programmable consumer electronics, network PCs, minicomputer systems, mainframe computer systems, and distributed cloud computing environments that include any of the above systems or devices, and the like.

In one example, a processor (e.g., processor 704) includes a plurality of functional components (or a subset thereof) used to execute instructions. These functional components can include, for instance, an instruction fetch component to fetch instructions to be executed; an instruction decode unit to decode the fetched instructions and to obtain operands of the decoded instructions; one or more instruction execute components to execute the decoded instructions; a memory access component to access memory for instruction execution, if necessary; and a write back component to provide the results of the executed instructions. One or more of the components can access and/or use one or more registers in instruction processing. Further, one or more of the components may (in one embodiment) include at least a portion of or have access to one or more other components used in performing neural network processing (or other processing that can use one or more aspects of the present invention), as described herein. The one or more other components can include, for instance, a neural network processing assist component (and/or one or more other components).

Other variations and embodiments are possible.

Figure 8A:
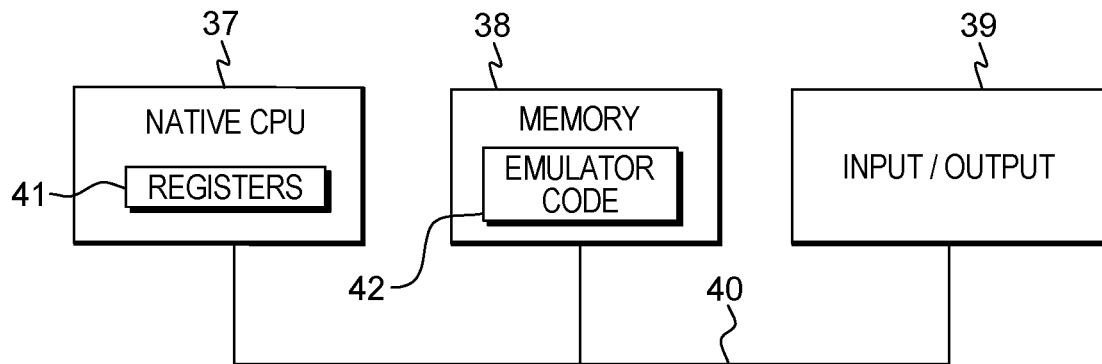
FIG. 8A depicts yet another example of a computing environment to incorporate and use one or more aspects of the present invention.

Another embodiment of a computing environment to incorporate and use one or more aspects of the present invention is described with reference to FIG. 8A. In this example, a computing environment 36 includes, for instance, a native central processing unit (CPU) 37, a memory 38, and one or more input/output devices and/or interfaces 39 coupled to one another via, for example, one or more buses 40 and/or other connections. As examples, computing environment 36 may include a Power® processor offered by International Business Machines Corporation, Armonk, New York; an HP Superdome with Intel® processors offered by Hewlett Packard Co., Palo Alto, California; and/or other machines based on architectures offered by International Business Machines Corporation, Hewlett Packard, Intel Corporation, Oracle, and/or others. PowerPC is a trademark or registered trademark of International Business Machines Corporation in at least one jurisdiction. Intel is a trademark or registered trademark of Intel Corporation or its subsidiaries in the United States and other countries.

Native central processing unit 37 includes one or more native registers 41, such as one or more general purpose registers and/or one or more special purpose registers used during processing within the environment. These registers include information that represents the state of the environment at any particular point in time.

Moreover, native central processing unit 37 executes instructions and code that are stored in memory 38. In one particular example, the central processing unit executes emulator code 42 stored in memory 38. This code enables the computing environment configured in one architecture to emulate another architecture. For instance, emulator code 42 allows machines based on architectures other than the z/Architecture instruction set architecture, such as Power processors, HP Superdome servers or others, to emulate the z/Architecture instruction set architecture and to execute software and instructions developed based on the z/Architecture instruction set architecture.

Figure 8B:
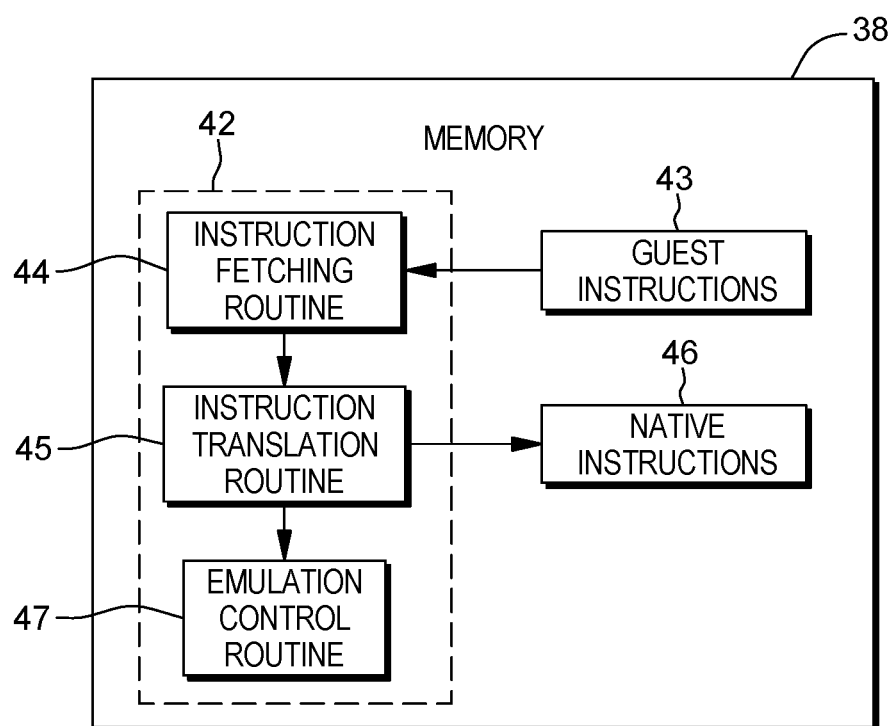
FIG. 8B depicts further details of the memory of FIG. 8A, in accordance with one or more aspects of the present invention.

Further details relating to emulator code 42 are described with reference to FIG. 8B. Guest instructions 43 stored in memory 38 comprise software instructions (e.g., correlating to machine instructions) that were developed to be executed in an architecture other than that of native CPU 37. For example, guest instructions 43 may have been designed to execute on a processor based on the z/Architecture instruction set architecture, but instead, are being emulated on native CPU 37, which may be, for example, an Intel processor. In one example, emulator code 42 includes an instruction fetching routine 44 to obtain one or more guest instructions 43 from memory 38, and to optionally provide local buffering for the instructions obtained. It also includes an instruction translation routine 45 to determine the type of guest instruction that has been obtained and to translate the guest instruction into one or more corresponding native instructions 46. This translation includes, for instance, identifying the function to be performed by the guest instruction and choosing the native instruction(s) to perform that function.

Further, emulator code 42 includes an emulation control routine 47 to cause the native instructions to be executed. Emulation control routine 47 may cause native CPU 37 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 46 may include loading data into a register from memory 38; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 41 of the native CPU or by using locations in memory 38. In embodiments, guest instructions 43, native instructions 46 and emulator code 42 may reside in the same memory or may be disbursed among different memory devices.

The computing environments described above are only examples of computing environments that can be used. Other environments, including but not limited to, non-partitioned environments, partitioned environments, cloud environments and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
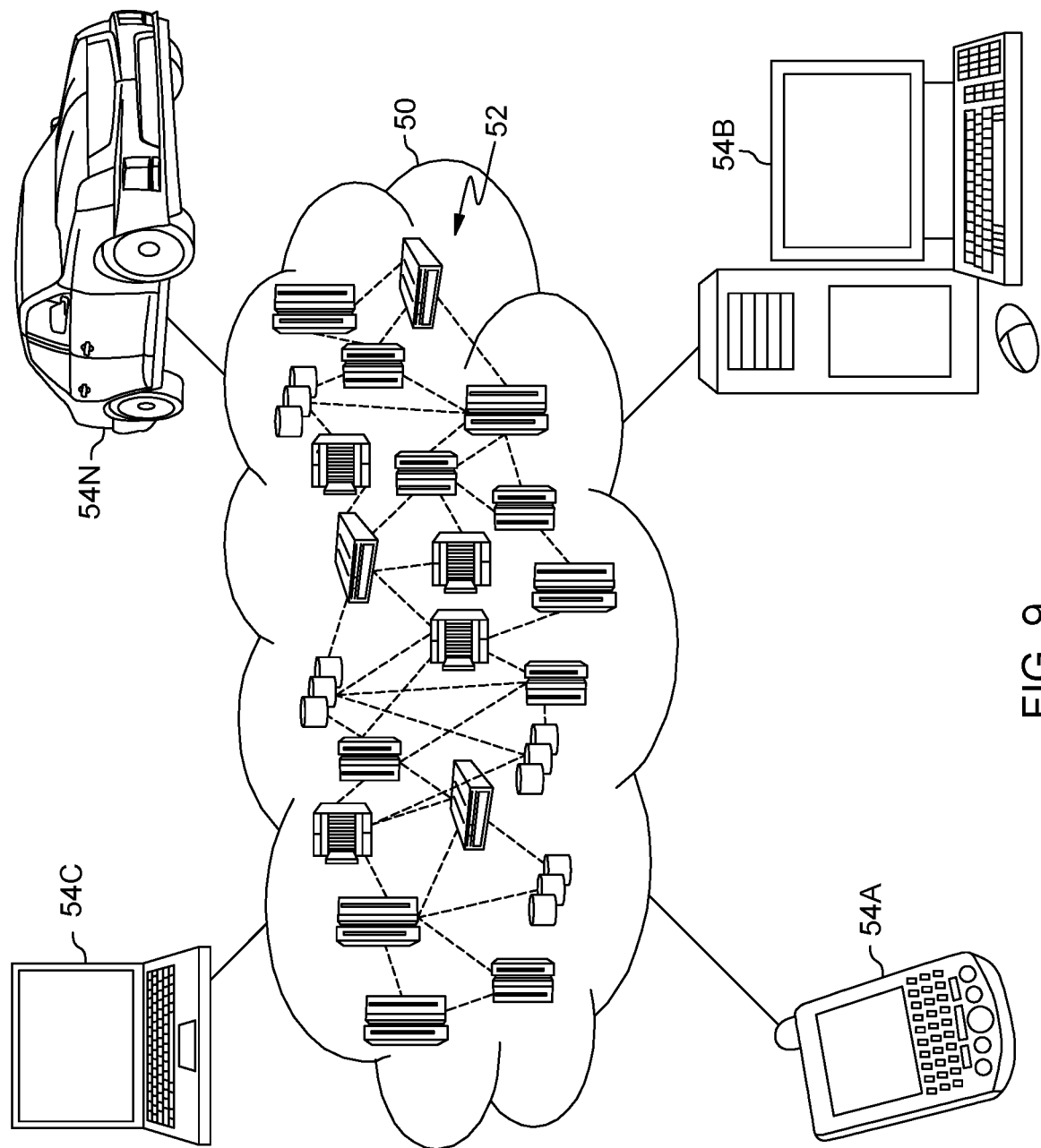
FIG. 9 depicts one embodiment of a cloud computing environment, in accordance with one or more aspects of the present invention.

Referring now to FIG. 9, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 52 and cloud computing environment 50 can communicate with any type of computerized device over any type of network and/or network addressable connection (e.g., using a web browser).

Figure 10:
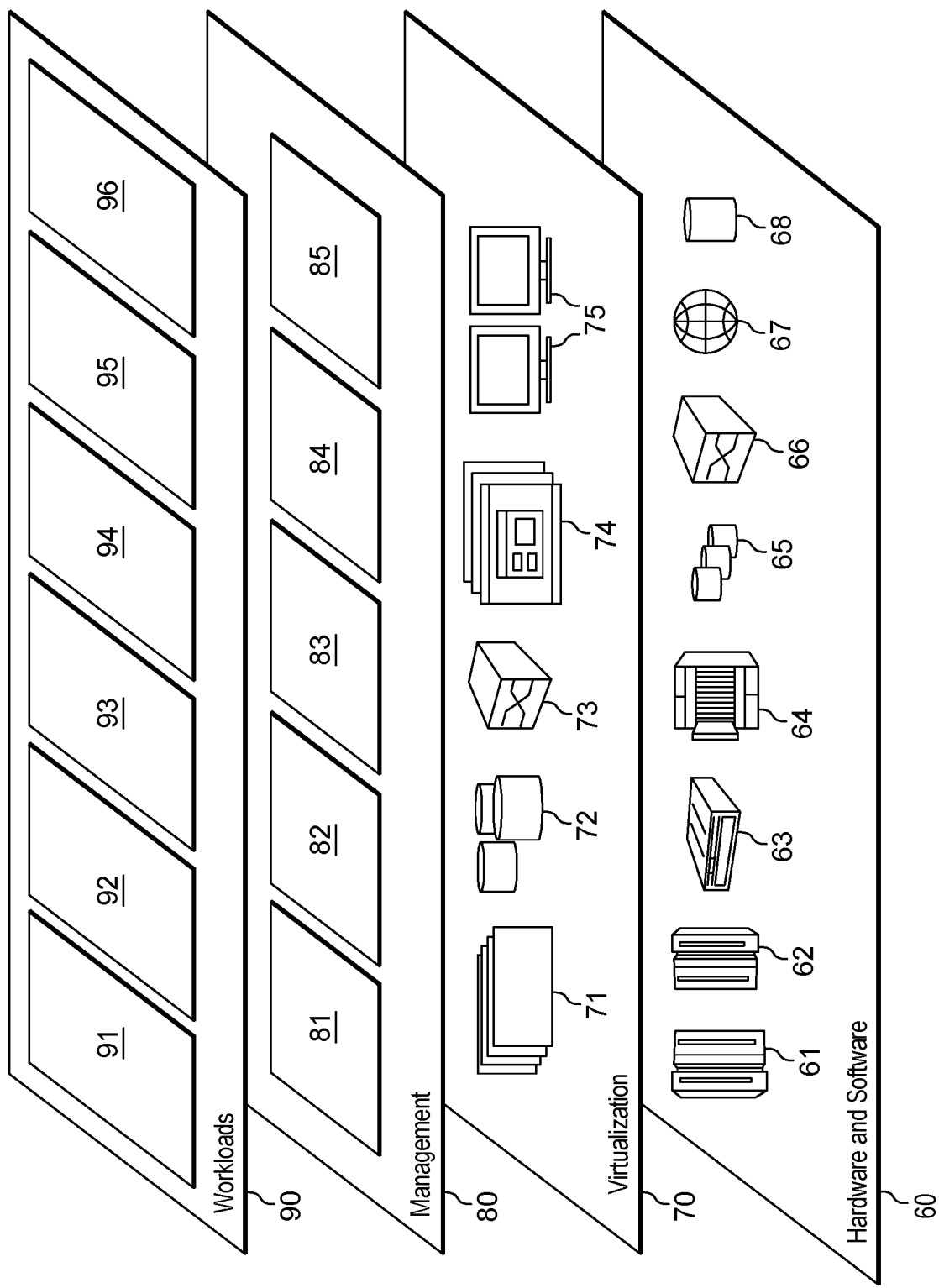
FIG. 10 depicts one example of abstraction model layers, in accordance with one or more aspects of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; augmented-reality object location-assist processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For instance, computing environments of other architectures can be used to incorporate and/or use one or more aspects. Further, different instructions or operations may be used. Additionally, different types of registers and/or different registers may be used. Further, other data formats, data layouts and/or data sizes may be supported. In one or more embodiments, one or more general-purpose processors, one or more special-purpose processors or a combination of general-purpose and special-purpose processors may be used. Many variations are possible.

Various aspects are described herein. Further, many variations are possible without departing from a spirit of aspects of the present invention. It should be noted that, unless otherwise inconsistent, each aspect or feature described herein, and variants thereof, may be combinable with any other aspect or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for providing augmented-reality object location assistance, the computer program product comprising:
one or more computer-readable storage media having program instructions embodied therewith, the program instructions being readable by a processing circuit to cause the processing circuit to perform a method comprising:
obtaining a user-request, the user-request being related to facilitating locating an object of interest;
identifying a target area containing the object of interest;
providing augmentation data for rendering as an overlay on a user-device to assist in directing the user to the target area containing the object of interest; and
dynamically changing the augmentation data being provided for rendering as the overlay as the user-device is moved in relation to the target area containing the object of interest to assist the user in locating the object of interest within the target area;
determining, based on identifiable attributes of multiple specified attributes of the object of interest and historical data from past searches of the object of interest, a first probability score related to location of the object of interest; and
determining, using machine learning, a second probability score of whether the object is within a visible range of a camera of the user-device, wherein a value of the second probability score being closer to zero indicates the object being farther away from the camera, and a value of the second probability score being closer to one indicates the object being closer to the camera,
the first probability score and the second probability score being used in providing the augmentation data for rendering as the overlay on the user-device.

2. The computer program product of claim 1, wherein the method further comprises:
receiving an image being captured by the user-device at the user's current location; and
wherein the providing comprises determining, based at least in part on the received image, the augmentation data for rendering as the overlay to assist in directing the user to the target area containing the object of interest.

3. The computer program product of claim 2, wherein the determining includes using image recognition to determine whether the object of interest is within the received image.

4. The computer program product of claim 1, wherein the augmentation data provided for rendering as the overlay comprises a color-coded indication to assist the user in locating the object of interest within the target area.

5. The computer program product of claim 4, wherein the dynamically changing comprises dynamically changing the color-coded indication as the user-device is moved in relation to the target area and the object of interest within the target area.

6. A computer system for providing augmented-reality object location assistance, the computer system comprising:
a memory; and
a processing circuit in communication with the memory, wherein the computer system is configured to perform a method, the method comprising:
obtaining a user-request, the user-request being related to facilitating locating an object of interest;
identifying a target area containing the object of interest;
providing augmentation data for rendering as an overlay on a user-device to assist in directing the user to the target area containing the object of interest; and
dynamically changing the augmentation data being provided for rendering as the overlay as the user-device is moved in relation to the target area containing the object of interest to assist the user in locating the object of interest within the target area;
determining, based on identifiable attributes of multiple specified attributes of the object of interest and historical data from past searches of the object of interest, a probability score related to location of the object of interest; and
determining, using machine learning, a second probability score of whether the object is within a visible range of a camera of the user-device, wherein a value of the second probability score being closer to zero indicates the object being farther away from the camera, and a value of the second probability score being closer to one indicates the object being closer to the camera, the first probability score and the second probability score being used in providing the augmentation data for rendering as the overlay on the user-device.

7. The computer system of claim 6, wherein the method further comprises:
receiving an image being captured by the user-device at the user's current location; and
wherein the providing comprises determining, based at least in part on the received image, the augmentation data for rendering as the overlay to assist in directing the user to the target area containing the object of interest.

8. The computer system of claim 7, wherein the determining includes using image recognition to determine whether the object of interest is within the received image.

9. A computer-implemented method comprising:
obtaining a user-request, the user-request being related to facilitating locating an object of interest;
identifying a target area containing the object of interest;
providing augmentation data for rendering as an overlay on a user-device to assist in directing the user to the target area containing the object of interest; and
dynamically changing the augmentation data being provided for rendering as the overlay as the user-device is moved in relation to the target area containing the object of interest to assist the user in locating the object of interest within the target area;
determining, based on identifiable attributes of multiple specified attributes of the object of interest and historical data from past searches of the object of interest, a probability score related to location of the object of interest; and
determining, using machine learning, a second probability score of whether the object is within a visible range of a camera of the user-device, wherein a value of the second probability score being closer to zero indicates the object being farther away from the camera, and a value of the second probability score being closer to one indicates the object being closer to the camera,
the first probability score and the second probability score being used in providing the augmentation data for rendering as the overlay on the user-device.

* * * * *